United States Patent
Munoz Osorio et al.

(10) Patent No.: US 12,246,451 B2
(45) Date of Patent: Mar. 11, 2025

(54) ROBOT CONTROL

(71) Applicant: KUKA Deutschland GmbH, Augsburg (DE)

(72) Inventors: Juan David Munoz Osorio, Augsburg (DE); Abdelrahman Abdelazim, Augsburg (DE)

(73) Assignee: KUKA Deutschland GmbH (DE)

( * ) Notice: Subject to any disclaimer, the term of this patent is extended or adjusted under 35 U.S.C. 154(b) by 276 days.

(21) Appl. No.: 17/802,262

(22) PCT Filed: Feb. 24, 2021

(86) PCT No.: PCT/EP2021/054514
§ 371 (c)(1),
(2) Date: Aug. 25, 2022

(87) PCT Pub. No.: WO2021/170623
PCT Pub. Date: Sep. 2, 2021

(65) Prior Publication Data
US 2023/0085221 A1   Mar. 16, 2023

(30) Foreign Application Priority Data

Feb. 28, 2020 (EP) .................................... 20159998

(51) Int. Cl.
*B25J 9/16* (2006.01)

(52) U.S. Cl.
CPC .......... *B25J 9/1633* (2013.01); *B25J 9/1661* (2013.01); *B25J 9/1666* (2013.01); *G05B 2219/40336* (2013.01); *G05B 2219/40338* (2013.01); *G05B 2219/40371* (2013.01)

(58) Field of Classification Search
CPC ...... B25J 9/1666; B25J 9/1633; B25J 9/1661; G05B 2219/40338; G05B 2219/40371; G05B 2219/40336
See application file for complete search history.

(56) References Cited

U.S. PATENT DOCUMENTS

| | | | | |
|---|---|---|---|---|
| 8,483,882 B2* | 7/2013 | Abdallah | ............... | H01R 13/17 700/262 |
| 8,874,262 B2* | 10/2014 | Mistry | ................... | B25J 9/1643 901/15 |
| 10,765,485 B2* | 9/2020 | Matsuda | ................ | A61B 34/30 |
| 11,247,738 B2* | 2/2022 | Lavalley | .............. | B25J 11/0015 |

OTHER PUBLICATIONS

Osorio et al., Physical Human-Robot Interaction under Joint and Cartesian Constraints, 2019, IEEE, p. 185-191 (Year: 2019).*
Hoffman et al., Multi-Priority Cartesian Impedance Control Based on Quadratic Programming Optimization, 2018, IEEE, p. 309-315 (Year: 2018).*

(Continued)

*Primary Examiner* — Mcdieunel Marc
(74) *Attorney, Agent, or Firm* — Dorton & Willis, LLP

(57) ABSTRACT

A method to control a robot to perform at least one Cartesian or joint space task comprises using quadratic programming to determine joint forces, in particular joint torques, and/or joint accelerations of said robot based on at least one cost function which depends on said task.

18 Claims, 3 Drawing Sheets

(56) References Cited

OTHER PUBLICATIONS

Flacco et al., Discrete-time velocity control of redundant robots with acceleration/torque optimization properties, 2014, IEEE, p. 5139-5144 (Year: 2014).*

Lutscher et al., Hierarchical inequality task specification for indirect force controlled robots using quadratic programming, 2014, IEEE, p. 4722-4727 (Year: 2014).*

Hoffman Enrico Mingo et al: "Multi-Priority Cartesian Impedance Control Based on Quadratic Programming Optimization", 2018 IEEE International Conference on Robotics and Automation (ICRA), IEEE, May 21, 2018 (May 21, 2018), pp. 309-315, XP033403668, DOI: 10.1109/ICRA.2018.8462877 abstract.

Liu Mingxing et al: "Generalized hierarchical control", Autonomous Robots, Kluwer Academic Publishers, Dordrecht, NL, vol. 40, No. 1, May 13, 2015 (May 13, 2015), pp. 17-31, XP035900652, ISSN: 0929-5593, DOI: 10.1007/S10514-015-9436-1 [retrieved an May 13, 2015] abstract p. 22-p. 24.

Ki Cheol Park et al: "The enhanced compact QP method for redundant manipulators using practical inequality constraints", Proceedings / 1998 IEEE International Conference on Robotics and Automation, May 16-20, 1998, Katholieke Universiteit Leuven, Leuven, Belgium, IEEE, New York, NY, USA, vol. 1, May 16, 1998 (May 16, 1998), pp. 107-114, XP010281110, ISBN: 978-0-7803-4300-9 pp. 108, 112.

European Patent Office; Search Report in related International Patent Application No. PCT/EP2021/054514 dated May 14, 2021; 2 pages.

Layale Saab et al: "Dynamic Whole-Body Motion Generation Under Rigid Contacts and Other Unilateral Constraints", IEEE Transactions on Robotics, IEEE Service Center, Piscataway, NJ, US, vol. 29, No. 2, Apr. 1, 2013 (Apr. 1, 2013), pp. 346-362, XP011499211. ISSN: 1552-3098, DOI: 10.1109/TRO.2012.2234351.

Alexander Dietrich et al: "An overview of null space projections for redundant, torque-controlled robots", The International Journal of Robotics Research, vol. 34, No. 11, Sep. 1, 2015 (Sep. 1, 2015), pp. 1385-1400, XP055613290, DOI: 10.1177/0278364914566516.

Siciliano B et al: "A general framework for managing multiple tasks in highly redundant robotic systems", Advanced Robotics, 1991. 'Robots in Unstructured Environments', 91 ICA R., Fifth International Conference on Pisa, Italy Jun. 19-22, 1991, IEEE, New York, NY, USA, Jun. 19, 1991 (Jun. 19, 1991), pp. 1211-1216v01.2, XP032159906, DOI: 10.1109/ICAR.1991.240390, ISBN: 978-0-7803-0078-1.

European Patent Office; Examination Report in related European Patent Application No. 20 159 998.2 dated Jan. 31, 2024; 10 pages.

* cited by examiner

ROBOT CONTROL

CROSS-REFERENCE TO RELATED APPLICATIONS

This application is a national phase application under 35 U.S.C. § 371 of International Patent Application No. PCT/EP2021/054514, filed Feb. 24, 2021 (pending), which claims the benefit of priority to European Patent Application No. EP20159998.2, filed Feb. 28, 2020, the disclosures of which are incorporated by reference herein in their entirety.

TECHNICAL FIELD

The present invention relates to robot control.

BACKGROUND

Modern robots may have at least one of the following features: they may be kinematically redundant, they may be compliant and/or they shall avoid obstacles.

In particular "freeing" or releasing Degrees of Freedom (DOF) may cause task redundancy, i.e. the DOF of the robot n is bigger than the DOF of the task m (n>m). This may also apply for robots with high(er) numbers of DOF and full DOF Cartesian tasks. Consequently, in such redundant cases, robots can perform more than one task at a time.

Compliant robots can in one embodiment be force-guided by a human: a user can push or hand-guide the robot. This may advantageously, in particular easily, fast, stable and/or reliably, be achieved by torque control, i.e. controlling the torques in the robot joints instead of or additional to poses, i.e. positions and/or orientations, and/or velocities.

In some cases it may be desired to avoid collision with static or moving objects, e.g. a second robot or the like.

A preferred application of the present invention may combine two or three of the following: task control, preferably multi-task control, compliance and obstacle avoidance, in particular in human-robot collaboration, e.g. how to deal with the fact that a robot is manually pushed close to a Cartesian obstacle object while it is performing a task. In other words, how can a controller implement that the task(s), e.g. pick-and-place, is/are constantly being pursued while the user still can interact with the compliant robot and objects are avoided?

In this respect in particular one or more of the following challenges may remain:

smooth vs. hard: for torque-controlled robots, tasks should be formulated in terms of forces or joint torques (for the sake of a more compact formulation, pairs of anti-parallel forces, i.e. torques, will sometimes also be called "forces" herein).

smooth task activation: the obstacle avoidance task should receive top priority. Nevertheless, it preferably should not continuously produce a torque but only be switched on when the Cartesian point on the robot is close to its limit. Switching a top-priority task on and off may lead to discontinuous solutions and oscillations.

Multi-level constraints: sometimes, it may be advantageous to realize not only e.g. Cartesian pose, in particular position, limits, but alternatively or additionally Cartesian velocity and/or acceleration limits, joint pose limits, torque limits or the like. If these are implemented in a stack of tasks, one of these limits may be sacrificed for another one.

A pose may comprise, in particular be or denote respectively, an one-, two- or three-dimensional position and/or an one-, two- or three-dimensional orientation. A joint pose thus may in particular be or denote respectively a position or orientation of one or more joints of the robot, in particular an angle of a revolute joint.

If those challenges are not properly dealt with, the robot may either react too weak (Cartesian object not avoided, robot hits the object), too hard (high torque peaks), and/or with jerky behavior and oscillations that prevent the task from being completed.

SUMMARY

The object of the present invention is to improve control or behavior of a robot, preferably to avoid or reduce one or more of the drawbacks and problems discussed above.

This object is achieved in particular by a method and a system or computer program (product) for performing a method as described herein.

According to an aspect of the present invention Quadratic Programming (QP) is used.

One advantage may be the possibility of including inequality constraints. Additionally or alternatively, it may be possible to have different constraints at the same level of priority. The task(s), e.g. following some trajectory, may be formulated as objective function(s) which preferably are minimized depending on relative importance. The priority between tasks could in particular be soft or strict priority as discussed later herein. Preferably, it can be selected between soft and strict priority, in particular dependent or pose and/or position or depending on a user choice. Constraints which are at the same level of priority like joint limit avoidance or obstacle avoidance may be preferably be formulated as inequality constraints which should never be violated.

In particular in order to include joint torque limits, the optimization problem variables may be (the) joint torques $\tau \in \mathbb{R}^n$ and/or joint accelerations $\ddot{q} \in \mathbb{R}^n$. Equality constraints, inequality constraints and/or objective functions preferably should be (affine) functions of either $\tau$ or $\ddot{q}$.

Quadratic programming (QP) is the process of solving quadratic problems with a convex quadratic cost function, in particular with linear equality and/or inequality constraints and/or box constraints. It may have the following general form where n is the number of variables in the optimization problem and m is the total number of linear equality and inequality constraints:

$$\min_x \frac{1}{2} x^T H x + x^T g$$

$$lbA \leq Ax \leq ubA$$

$$lb \leq x \leq ub$$

wherein H(x) denotes the positive (semi) definite and symmetric Hessian matrix $\in \mathbb{R}^{n \times n}$, g(x) denotes the gradient vector $\in \mathbb{R}^n$, A denotes the constraint matrix $\in \mathbb{R}^{m \times n}$, lbA and ubA denotes the gradient vector $\Sigma \mathbb{R}^m$ (lbA=ubA for equality constraints) and lb and ub denote the box constraints $\in \mathbb{R}^n$, upper and lower bounds for the problem variables.

Redundancy Resolution as a Linear Quadratic Problem

A linear least square problem is of the form:

$$\min_x \frac{1}{2} \|Ax - b\|^2$$

This problem may be transferred to a quadratic problem by rewriting $$\frac{1}{2}(Ax-b)^T(Ax-b) = \frac{1}{2}\left(x^T A^T A x - x^T A^T b - b^T A x + b^T b\right)$$
$$= \frac{1}{2}\left(x^T A^T A x - 2x^T A^T b + b^T b\right)$$

Since $b^T b$ is a constant it can be neglected. Thus the quadratic cost function becomes:

$$C(x) = \frac{1}{2} x^T A^T A x - x^T A^T b$$

Comparing to the general QP form, $H(x)=A^T A$, $g(x)=-A^T b$

A Cartesian or Joint space task respectively can be formulated as:

$$f_t = J_t \ddot{q} + \dot{J}_t \dot{q}$$

where $f_t$ is the desired Cartesian or joint acceleration respectively and $J_t, \dot{J}_t, \dot{q}$ and $\ddot{q}$ are the task Jacobian, time derivative of the task Jacobian, joint velocities and joint accelerations respectively. The subscript t denotes the task number. In case of a joint space task $J_t$ is constant and equal to identity, I.

The problem can be formulated as a least square problem in terms of the joint accelerations $\ddot{q}$:

$$\min_{\ddot{q}} \left\| J_t \ddot{q} - (f_t - \dot{J}_t \dot{q}) \right\|^2$$

In that case, the problem can be written in the quadratic form with $H_t(\ddot{q})=J_t^T J_t$ and $g_t(\ddot{q})=-J_t^T (f_t-\dot{J}_t\dot{q})$ in Cartesian space control and $H_t(\ddot{q})=I$ and $g_t(\ddot{q})=-f_t$ in the Joint space control.

The upper and lower bounds for the optimization problem, ub and lb may preferably be:

$$ub = \begin{pmatrix} \tau_{max} \\ \ddot{Q}_{max} \end{pmatrix}, lb = \begin{pmatrix} \tau_{min} \\ \ddot{Q}_{min} \end{pmatrix}$$

where $\tau_{min}$ and $\tau_{max}$ are the lower and upper bounds for the joint torques and $\ddot{Q}_{min}$ and $\ddot{Q}_{max}$ are the lower and upper bounds for the joint accelerations, preferably after reshaping using limits of joint pose, velocity and/or acceleration (see below).

For dynamic consistency, the robot's joint space dynamic equation $M\ddot{q}+g(\dot{q}, q)+c(q)=\tau$ with the mass matrix M may be included as an (in)equality constraint:

$$g + c \leq (I - M)\begin{pmatrix} \tau \\ \ddot{q} \end{pmatrix} \leq g + c$$

Limits in the Cartesian space and/or obstacle avoidance may be augmented to the constraint matrix A and constraint vectors lbA and ubA:

$$A = [0 \ J_c]$$

where 0 is a zero matrix with the same size of $J_c$. The constraint vector may be $$ubA=(\ddot{X}_{max}), lbA=(\ddot{X}_{min})$$

wherein $\ddot{X}$ denotes a Cartesian acceleration of the robot, e.g. its TCP, end effector or flange respectively or the like.

The output will thus be optimal torque and/or joint accelerations that can command the robot.

The problem can analogously or likewise be formulated as a least square problem in terms of the joint accelerations q and forces, in particular torques, as follows according to one embodiment respectively:

$$\min_{\ddot{q},\tau} \left\| J_t \ddot{q} - (\ddot{x}_t - \dot{J}_t \dot{q}) \right\|^2 + w\|\ddot{q} - \ddot{q}_d\|^2$$

subject to $$\tau = M(q)\ddot{q} + h(\dot{q},q) + g(q)$$

$$\tau_m \leq \tau \leq \tau_{max}$$

$$\ddot{c}_{min} \leq J_c \ddot{q} + \dot{J}_c \dot{q} \leq \ddot{c}_{max}$$

where M, g and h are the mass or inertia matrix respectively, the gravity and the Coriolis forces respectively. The desired acceleration can be defined given the error dynamics $$\ddot{x}_d + k_p \Delta x + k_d \Delta \dot{x}$$

according to one embodiment where $\Delta x$ is the error $x_d-x_c$ between the desired pose)(a and the current pose $x_c$.

In particular if interaction/compliant behaviour is desired, the robot may commanded by torque.

Alternatively, in particular if the robot shall move accurate, the optimal joint acceleration can be integrated, thus yielding desired joint pose for every control cycle.

Thus, according to one embodiment different kinds of constraints, in particular force, in particular torque, acceleration, velocity and/or pose limits in joint and/or Cartesian space and/or static and/or moving obstacles, can be ensured while trying to perform at least one task, in particular a set of tasks, and with or without physical human robot interaction.

Quadratic programming (QP) may in particular have the advantage of including a set of constraints and keeping all respected while minimizing a cost function.

Several tasks in one cost function may lead to a dependency on chosen weights and it may be necessary to write the constraints to be linear with the variable to be minimized. E.g. if one minimizes a function depending on torque, $f(\tau)$, the it is easy to limit forces, but not as easy to limit poses or velocities. Furthermore, if there arises a conflict between constraints one must be sacrificed by the other one (or the robot should stop if a conflict is encountered). Using quadratic programming can solve this problem and in particular new constraints like torque limits or static or moving obstacles can be included and/or the problem of constraining orientation can be solved as discussed later herein.

Thus, according to one embodiment of the present invention different kinds of constraints are observed or met respectively, in particular Cartesian and/or joint pose, velocity and/or acceleration limits, force and/or torque limits, static obstacles and/or moving obstacles of a torque- and/or pose-controlled robot, in particular while a human user applies external forces onto an arbitrary point of the robot structure. According to one embodiment:

the robot continues to follow a programmed task or stack of tasks while offering compliance within defined constraints; and/or if a Cartesian limit is approached, a counteracting force, in particular torque, particularly for orientations, is, preferably smoothly, induced, advantageously not causing oscillations or jerky robot motion; and/or the smoothness is guaranteed by specifying maximum velocity, maximum acceleration and/or maximum force, in particular torque, values that preferably are always respected; and/or two or more, in particular all, limits have identical priority, i.e. none of these limits will be sacrificed in favor of another; and/or besides these quantities, no additional parameters such as a function for continuous task activation, magnitude of the Cartesian torque preventing the Cartesian limit or the like need to be specified.

One advantage of one embodiment of the present invention is that a robot can continue its programmed task while the user interacts. This can save cycle time in human-robot collaborative applications. Another advantage is the simplified control programming. According to one embodiment only maximum Cartesian pose, velocity, and/or acceleration values are/must be specified. These can be set by the user, depending on the application. Torque limits are specified by robot specification or depending on the task(s) according to one embodiment. Cartesian limits are set depending on the shape of the avoided Cartesian obstacle according to one embodiment. This shape is determined from a CAD Model or computer vision according to one embodiment.

Other values that are necessary for state-of-the-art techniques, e.g., a function for continuous task activation, the magnitude of the Cartesian force preventing the Cartesian limit or the like advantageously are not necessary according to one embodiment. These parameters are usually very hard to find, as they strongly depend on the robot structure, its configuration, attached tools etc.

In case of moving obstacles, the motion of the object(s) can be estimated by (computer) vision techniques or by IMU sensors according to one embodiment. In case an object is another robot the encoders of said other robot can be used to specify the motion and velocity of it according to one embodiment.

Although the present invention may particularly advantageously used on robot human interaction, it is not limited thereto but to the contrary can also be used to command the robot in pose or with no (controlled) compliance respectively, which advantageously can produce a high accuracy motion while meeting (all) constraints. According to one embodiment an optimal joint acceleration to produce the (desired) motion of the robot is determined. This acceleration may be integrated to get a joint pose according to one embodiment.

According to one embodiment the robot has two or more tasks to be accomplished. According to one embodiment a prioritization (scheme) is provided to indicate the importance of some task(s) over (an)other(s).

Soft Hierarchy

According to one embodiment a soft hierarchy prioritization (scheme) is implemented: in said soft hierarchy scheme, a weight is assigned for each task depending on its relative importance to other tasks. Consider a robot performing k tasks simultaneously, where $task_t$ is of more relative importance to $task_{t+i}$, etc., i.e. priority($task_1$)>priority($task_2$) >priority($task_k$). A higher weight $w_t$ is given to the more prior task $task_t$, $w_1>w_2>w_k$. The higher is the ratio between two weights, the stricter is the hierarchy. The soft hierarchy solves only one QP per iteration For each task, the Hessian matrix $H_t$ and gradient vector $g_t$ are calculated as described herein, particularly above, and then summed together depending on their associate weights:

$$H_{sum} = \sum_{t=1}^{k} H_t \quad g_{sum} = \sum_{t=1}^{k} g_t$$

Soft priority allows that the lower priority tasks could interfere with a higher priority task.

Strict Hierarchy

According to another embodiment a strict hierarchy prioritization (scheme) is implemented: in said strict hierarchy scheme, priority guaranties the prioritized scheme, lower priority tasks are scarified if they conflict with higher ones.

According to one embodiment of the strict hierarchy prioritization (scheme) the number of QPs solved depends on or equals the number of tasks involved respectively. So in total for k tasks, k QPs are solved per iteration.

For k tasks, in the $t^{th}$ QP, tasks is minimized in the null space of all previous tasks $task_0, \ldots, task_{t-1}$. They are included as (in)equality constraints according to one embodiment. The size of the quadratic problem increases in every QP because of the increase in the set of equality constraints.

In particular for two tasks $task_1$ (high(er) priority), $task_2$ (low(er) priority):

$1^{st}$QP:

$$\min_{\ddot{q}_1, \tau_1} \frac{1}{2} \ddot{q}_1^T H_1 \ddot{q}_1 + \ddot{q}_1^T g_1$$

$$\begin{pmatrix} \tau_{min} \\ \ddot{Q}_{min} \end{pmatrix} \leq \begin{pmatrix} \tau_1 \\ \ddot{q}_1 \end{pmatrix} \leq \begin{pmatrix} \tau_{max} \\ \ddot{Q}_{max} \end{pmatrix}$$

$$\begin{pmatrix} g+c \\ \ddot{X}_{min} - J_c \dot{q} \end{pmatrix} \leq \begin{pmatrix} I & -M \\ 0 & J_c \end{pmatrix} \begin{pmatrix} \tau_1 \\ \ddot{q}_1 \end{pmatrix} \leq \begin{pmatrix} g+c \\ \ddot{X}_{max} - J_c \dot{q} \end{pmatrix}$$

$2^{nd}$QP:

$$\min_{\ddot{q}_2, \tau_2} \frac{1}{2} \ddot{q}_2^T H_2 \ddot{q}_2 + \ddot{q}_2^T g_2$$

$$\begin{pmatrix} \tau_{min} \\ \ddot{Q}_{min} \end{pmatrix} \leq \begin{pmatrix} \tau_2 \\ \ddot{q}_2 \end{pmatrix} \leq \begin{pmatrix} \tau_{max} \\ \ddot{Q}_{max} \end{pmatrix}$$

$$\begin{pmatrix} g+c \\ \ddot{X}_{min} - J_c \dot{q} \\ J_1 \ddot{q}_1 \end{pmatrix} \leq \begin{pmatrix} I & -M \\ 0 & J_c \\ 0 & J_1 \end{pmatrix} \begin{pmatrix} \tau_2 \\ \ddot{q}_2 \end{pmatrix} \leq \begin{pmatrix} g+c \\ \ddot{X}_{max} - J_c \dot{q} \\ J_1 \ddot{q}_1 \end{pmatrix}$$

For multiple tasks:

$$\min_{\ddot{q}_i, \tau_i} \frac{1}{2} \ddot{q}_i^T H_i \ddot{q}_i + \ddot{q}_i^T g_i$$

$$\begin{pmatrix} \tau_{min} \\ \ddot{Q}_{min} \end{pmatrix} \leq \begin{pmatrix} \tau_i \\ \ddot{q}_i \end{pmatrix} \leq \begin{pmatrix} \tau_{max} \\ \ddot{Q}_{max} \end{pmatrix}$$

$$\begin{pmatrix} g+c \\ \ddot{X}_{min} - J_c \dot{q} \\ J_{i-1} \ddot{q}_{i-1} \\ \vdots \\ J_1 \ddot{q}_1 \end{pmatrix} \leq \begin{pmatrix} I & -M \\ 0 & J_c \\ 0 & J_{i-1} \\ \vdots \\ 0 & J_1 \end{pmatrix} \begin{pmatrix} \tau_i \\ \ddot{q}_i \end{pmatrix} \leq \begin{pmatrix} g+c \\ \ddot{X}_{max} - J_c \dot{q} \\ J_{i-1} \ddot{q}_{i-1} \\ \vdots \\ J_1 \ddot{q}_1 \end{pmatrix}$$

As can be seen from the last line(s), the joint coordinates $q_i$ used for $task_i$ may in particular be the joint coordinates $q_j$ used for one or more higher prioritized $task_{j<i}$ or another sub-set of the robot's joint coordinates fulfilling said equation(s) $J_j \dot{q}_j = J_i \dot{q}_i$.

Shaping Joint Acceleration Limits

According to one embodiment one or more of the following bounds on the joint ranges, joint velocities and joint accelerations are predetermined:

$Q_{min} < q < Q_{max}$ $V_{min} < \dot{q} < V_{max}$ $A_{min} < \ddot{q} < A_{max}$ In particular if the acceleration bounds come from pure kinematic reasoning then according to one embodiment $A_{min} = -A_{max}$.

According to one embodiment the joint acceleration command is kept constant at the computed value $\ddot{q} = \ddot{q}_h = \ddot{q}(t_h)$ for a time of duration or step dt respectively. Assuming that at $t_h = hdt$ the current joint pose $q = q_h$ and velocity $\dot{q} = \dot{q}_h$ are both feasible the next joint velocity and pose may be estimated by:

$$q_{h+1} \cong q_h + \dot{q}_h dt + \frac{1}{2} \ddot{q}_h dt^2$$

$$\dot{q}_{h+1} \cong \dot{q}_h + \ddot{q}_h dt$$

Keeping within their bounds yields:

$$\frac{V_{min} - q}{T} \leq \ddot{q}_h \leq \frac{V_{max} - q}{T} \text{ and}$$

$$2\frac{Q_{min} - q_h - \dot{q}_h T}{T^2} \leq \ddot{q}_h \leq 2\frac{Q_{max} - q_h - \dot{q}_h T}{T^2}$$

With the constraints given by the inequalities above and those in the previous two equations a box constraint for the command $\ddot{q}$ at time $t=t_h$ may be obtained:

$\ddot{Q}_{min}(t_h) \leq \ddot{q} \leq \ddot{Q}_{max}(t_h)$

According to one embodiment $V_{max}$ and $V_{min}$ are shaped as follows, in particular to reduce the velocity smoothly in the proximity to the joint:

$V_{max} = \min(V_{max}, \sqrt{2A_{max}(Q_{max} - q_h)})$ $V_{min} = \max(V_{min}, -\sqrt{2A_{max}(q_h - Q_{min})})$ Thus, the behavior of the joint coming to its limit can be done smoothly to avoid a big change in the velocity in just one instance of time according to one embodiment. Thereby, the quadratic function may be set to properly shape the velocity bundaries. In this way the velocity may advantageously be reduced before coming to the joint limits. Thus, $\ddot{Q}_{min}$ and $\ddot{Q}_{max}$ can advantageously be included in the QP problem.

Shaping Cartesian Acceleration Limits

According to one embodiment one or more of the following bounds on the Cartesian ranges, Cartesian velocities and Cartesian accelerations are predetermined:

$X_{min} < X < X_{max}$ $V_{min} < \dot{X} < V_{max}$ $A_{min} < \ddot{X} < A_{max}$ where X is a vector of the current Cartesian pose of a robot-fixed reference, e.g. the TCP, an end effector or flange respectively, a joint like e.g. the elbow, or the like, in the dimension to be constrained. In particular if the acceleration bounds come from pure kinematic reasoning, then according to one embodiment $A_{min} = -A_{max}$.

According to one embodiment the Cartesian acceleration command is kept constant at the computed value $\ddot{X} = \ddot{X}_h = \ddot{X}(t_h)$ for a time of duration or step dt respectively. Assuming that at $t_h = hdt$ the current Cartesian pose $X = X_h$ and velocity $\dot{X} = \dot{X}_h$ are both feasible, the distance to the max limit may be denoted by:

$d_{max} = X_{max} - X_h$ $d_{min} = X_{min} - X_h$

Keeping the next Cartesian velocity and pose $$X_{h+1} \cong X_h + \dot{X}_h dt + \frac{1}{2} \ddot{X}_h dt^2$$

$$\dot{X}_{h+1} \cong \dot{X}_h + \ddot{X}_h dt$$

within their bounds yield:

$$\frac{V_{min} - \dot{X}}{T} \leq \ddot{X}_h \leq \frac{V_{max} - \dot{X}}{T} \text{ and}$$

$$2\frac{d_{min} - \dot{X}_h T}{T^2} \leq \ddot{X}_h \leq 2\frac{d_{max} - \dot{X}_h T}{T^2}$$

With the constraints given by the inequalities above and those in the previous two equations a box constraint for the command $\ddot{X}$ at time $t=t_h$ may be obtained:

$\ddot{X}_{min}(t_h) \leq \ddot{X} \leq \ddot{X}_{max}(t_h)$

According to one embodiment $V_{max}$ and $V_{min}$ are shaped as follows, in particular to reduce the velocity smoothly in the proximity to the joint:

$V_{max} = \min(V_{max}, \sqrt{2A_{max}(d_{max})})$ $V_{min} = \max(V_{min}, -\sqrt{2A_{max}(-d_{min})})$ Thus, the behavior of the Cartesian point coming to its limit can be done smoothly to avoid a big change in the velocity in just one instance of time. Thus, $\ddot{X}_{min}$ and $\ddot{X}_{max}$ can advantageously be included in the QP problem.

Computing of Jacobian $J_c$ for Position

The Jacobian for the constraint $J_c$ is or defines a subspace of the Cartesian space respectively. The columns of the Jacobian represent each joint of the robot, and the rows represent the dimension in which the limit is set. For example the whole Jacobian J for a 7 DoF robot will have the size 6×7, three translational or positional respectively and three rotational coordinates at a Cartesian point e.g. the TCP [x, y, z, α, β, γ] represent the rows of the Jacobian:

$$J = \begin{bmatrix} j_{1,1} & j_{1,2} & j_{1,3} & j_{1,4} & j_{1,5} & j_{1,6} & j_{1,7} \\ j_{2,1} & j_{2,2} & j_{2,3} & j_{3,4} & j_{4,5} & j_{5,6} & j_{6,7} \\ j_{3,1} & j_{3,2} & j_{3,3} & j_{3,4} & j_{3,5} & j_{3,6} & j_{3,7} \\ j_{4,1} & j_{4,2} & j_{4,3} & j_{4,4} & j_{4,5} & j_{4,6} & j_{4,7} \\ j_{5,1} & j_{5,2} & j_{5,3} & j_{5,4} & j_{5,5} & j_{5,6} & j_{5,7} \\ j_{6,1} & j_{6,2} & j_{6,3} & j_{6,4} & j_{6,5} & j_{6,6} & j_{6,7} \end{bmatrix}$$

If one coordinate, e.g. the coordinate y, is to be limited, e.g. a wall located in a y direction, then, the Jacobian that represents the constrained coordinate, $J_c$, will be the corresponding row of J, in said example the second row of J:

$J_c=[j_2, j_{2,2}, j_{2,3}, j_{2,4}, j_{2,5}, j_{2,6}, j_{2,7}]$

If e.g. the direction z is to be also constrained because the robot should not hit a table, $J_c$ will be the second and the third row of J:

$$J_c = \begin{bmatrix} j_{2,1} & j_{2,2} & j_{2,3} & j_{2,4} & j_{2,5} & j_{2,6} & j_{2,7} \\ j_{3,1} & j_{3,2} & j_{3,3} & j_{3,4} & j_{3,5} & j_{3,6} & j_{3,7} \end{bmatrix}$$

According to one embodiment the Jacobian may be the transformation of the velocity of a robot-fixed reference point or coordinate system (origin) respectively, in particular the TCP or another Cartesian point like e.g. a reference point in the robots elbow, and the joint space, i.e. space of the robots joint coordinates, in particular joint angles. For instance if the direction y and z have to be constrained for the Cartesian position of joint 4 (elbow), $J_c$ becomes:

$$J_c = \begin{bmatrix} j_{2,1} & j_{2,2} & j_{2,3} & j_{2,4} & 0 & 0 & 0 \\ j_{3,1} & j_{3,2} & j_{3,3} & j_{3,4} & 0 & 0 & 0 \end{bmatrix}$$

Avoidance of Static Obstacles

According to one embodiment, in particular for avoiding obstacles, the Jacobian is rotated and $\ddot{X}_{min}$ and $\ddot{X}_{max}$ are computed in a predetermined direction:

In particular for obstacles like walls or the like that are perpendicular to one of the coordinates a limit value may be defined on one coordinate axis according to one embodiment.

In particular for more complex(ly shaped) obstacles like robot's arm and other environmental objects, one or more virtual, preferably 3 dimensional, geometric models of the objects are determined according to one embodiment which may in particular include the (controlled) robot itself. According to one embodiment one or more (such) virtual models are determined using (computer) vision techniques.

According to one embodiment, in particular using such virtual model(s), the closest distance between the robot and any object and/or the closest point (to any object) on the robot (CP-R) and/or on the, in particular closest, object (CP-O) are computed. After identifying such critical points, a momentary goal is (added or defined respectively) to avoid the collision between these points according to one embodiment. Therefore, advantageously only kinematics parameters of CP-R in the direction of CP-O have to be considered. These parameters may include velocity, acceleration and/or the Jacobian of CP-R in the direction of CP-O, basically the direction along the shortest distance, which is denoted "critical direction" herein. This advantageously can ensure the saturation of its acceleration only along critical direction and allows the CP-R's motion in all other directions.

According to one embodiment the Jacobian is rotated along the critical direction to obtain velocities and acceleration also expressed in this direction. According to one embodiment a rotation matrix is defined or determined respectively which can rotate the coordinate system of critical points in such a way that one of the coordinate axis (e.g. Z-Axis) aligns with the critical direction. Using this rotation matrix Jacobian can be expressed in aligned coordinates.

According to one embodiment said rotation matrix is derived from axis-angle representation of a coordinate orientation, in particular by rotating one axis, e.g. the Z-Axis, until it aligns with the critical direction vector. If for example the Z-Axis needs to be rotated by $\theta$ around the rotation axis which is a perpendicular axis to the plane of rotation, in particular the plane that contains both the Z-Axis and the critical direction vector (see FIG. 1):

Let CP-R or CPR respectively be the respective point of the robot and denoted by $(x_1, x_2, x_3)$ and CP-O or CPO respectively be the respective point of the obstacle and denoted by $(y_1, y_2, y_3)$. A unit vector u $((c_1, c_2, c_3))$ in the critical direction can be obtained by the following equations:

$$|L| = \sqrt{((y_1 - x_1)^2 + (y_2 - x_2)^2 + (y_3 - x_3)^2)}$$

$$c_1 = \frac{(y_1 - x_1)}{|L|}, c_2 = \frac{(y_2 - x_2)}{|L|}, c_3 = \frac{(y_3 - x_3)}{|L|}$$

where |L| is the normalized distance between the two points. The axis of rotation should be perpendicular to the plane of rotation. Hence the cross product between the unit critical direction vector and Z-Axis produces a common perpendicular vector which in turn is perpendicular to the plane of rotation. Therefore, the axis of rotation $A_{rot}=u\times(0, 0, 1)$. The angle between the Z-Axis z=(0, 0, 1) and the critical direction vector u can be calculated from their dot product according to:

$$\theta = \cos^{-1} \frac{u \cdot z}{\sqrt{u * z}}$$

Based on said axis $A_{rot}$ and angle $\theta$ the required rotation matrix can be determined which by multiplication transforms the representation from base coordinates (O) to aligned (with critical direction) coordinates (C). This rotation is denoted as $^cR_0$. The equation to determine the coordinates with aligned Z axis is given by:

$$^cCP = ^cR_0 * ^0CP$$

The maximal or closest distance respectively in this case can be determined according to:

$$d_{max} = ^cCPO - ^cCPR$$

where $^0CP$ and $^cCP$ are coordinates of critical points represented in original coordinate system and aligned coordinate system respectively. If the coordinates are aligned it is sufficient to find the accelerations along one coordinate axis (in this example the Z-Axis) which provides the Cartesian acceleration in the critical direction:

$$J_n = ^cR_0 * J_t$$

where $J_t$ are the first 3 rows of J. Thus, $J_c = J_{n,3}$, i.e. the third row of $J_n$, because the Z-Axis is aligned with the z direction. $\ddot{X}_{min}$ and $\ddot{X}_{max}$ are determined from the shaping function with the new rotated velocities according to one embodiment:

$$\dot{X} = ^cR_0 ^c\dot{CP}$$

Avoidance of Dynamic Obstacles

To avoid dynamic obstacles, a change in the shaping function is done according to one embodiment to include the velocity of the object relative to the velocity of the robot. Before we assumed that CP-O had zero velocity. If the obstacle is moving, this is not true anymore. Therefore, this velocity $\dot{X}_{cp-o}$ may be included in the shaping:

The next Cartesian velocity and pose may be estimated according to:

$$X_{h+1} \cong X_h + \dot{X}_h dt + \frac{1}{2}\ddot{X}_h dt^2$$

$$\dot{X}_{h+1} \cong \dot{X}_h + \ddot{X}_h dt$$

Here $\dot{X}_h$ is the relative velocity between the critical points.

$$\dot{X}_h = \dot{X}_{cr\text{-}o} - \dot{X}_{cp\text{-}o}$$

where $\dot{X}_{cr\text{-}o}$ is the velocity of the critical point on the robot. Now the boundaries may be shaped as it was explained above with respect to shaping joint acceleration limits, in particular in section "Shaping joit/Cartesian acceleration limits".

Constraining Orientation

According to one embodiment additionally or alternatively to the position limits in Cartesian space the orientation is constrained.

Lets $R_{cur}$ be a current frame to be constrained, e.g. the end effector frame of the robot, and $R_{ref}$ from where the limits are referenced. Thus, the goal may e.g. be to limit the orientation around one axis of $R_{ref}$ in 45°.

In FIG. 2 both frames are shown, $R_{ref}$ is indicated in dashed lines and $R_{cur}$ in continuous lines. The rotation frames are composed by unit vectors that represent every axis:

$$R_{ref} = [X_{ref} Y_{ref} Z_{ref}]$$

$$R_{cur} = [X_{cur} Y_{cur} Z_{cur}]$$

Consider a constrained rotation around the x-axis. For this example $Z_{cur}$ must not be separated more than a maximal distance (given by $\theta_{max}$) of the plane Π defined by $x_{ref}$ and $Z_{ref}$ (dotted in FIG. 2). To determine this distance, $Z_{cur}$ is projected into the plane and then the distance between these two vectors $z_{cur}$, $z_{proj}$ is determined. To avoid singularities of definition and always have a positive value, e may be computed according to:

$$\theta = \text{atan } 2(\|Z_{cur} \times Z_{proj}\|, Z_{cur} \cdot Z_{proj})$$

Then the distance may be determined according to: $d_{max} = \theta_{max} - \theta$. Based on said distance the Jacobian to express velocities in the same frame may be determined: the Jacobian $J_r$ transforms the joint velocities to the velocity in the orientation of the current frame:

$$J_r \dot{q} = \begin{bmatrix} w_x \\ w_y \\ w_z \end{bmatrix}$$

where $w_x$, $w_y$ and $w_z$ are the angular velocities around the vectors $X_{cur}$, $Y_{cur}$ and $Z_{cur}$, respectively. In order to rotate the Jacobian in a way that the angular velocity around the x-axis expresses the angular velocity to move $z_{cur}$ to $z_{proj}$, $w_{x,j}$ a new rotation frame, $R_j = [x_j \ y_j \ z_j]$ may be used to rotate the Jacobian. As rotation shall be around $x_j$, this vector must be perpendicular to $z_{cur}$ and $z_{proj}$, i.e. $x_j = z_{proj} \times Z_{cur}$ (thus the positive direction of rotation is going away from the plane). $y_j$ is to be the projection of $z_{proj}$ on the plane defined by $x_{cur}$ and $y_{cur}$. To complete the frame $z_j = z_{cur}$. This gives the rotated Jacobian:

$$J_j = R_j^T J_r$$

The first row of $J_j$ relates the joint velocities with the angular velocity $w_{x,j}$:

$$J_{j,1} \dot{q} = w_{x,j}$$

$w_{x,j}$ and d are the inputs for the shaping of the constraints function and $J_{j,\ 1}$ will be the Jacobian to determine the constraints in the QP problem: $J_c = J_{j,\ 1}$. Vividly what is happening is that the vector $x_{curr}$ is avoiding to go out of two cones that are symmetrically separated by the plane of $x_{ref}$ and $z_{ref}$.

To constrain orientation around y, analogously the distance between $z_{cur}$ and the plane $y_{ref}$ and $z_{ref}$ may be determined. $R_j$ in this case then may be $R_j = [Z_{proj} \times z_{cur}\ z_{cur} \times (Z_{proj} \times z_{cur}) z_{proj}]$ where $Z_{proj}$ for this case is the projection of $z_{cur}$ into the plane of $y_{ref}$ and $z_{ref}$.

To constrain orientation around z, analogously the distance between $Y_{cur}$ and the plane $y_{ref}$ and $z_{ref}$ may be determined. $R_j$ in this case then may be $R_j = [y_{proj} \times y_{cur}\ y_{cur} \times (y_{proj} \times y_{cur})\ y_{curr}]$ where $Z_{proj}$ for this case is the projection of $y_{cur}$ into the plane of $y_{ref}$ and $z_{ref}$.

In order to constrain two orientations according to one embodiment the Jacobians and maximal and minimal acceleration values are stacked or a single cone for one axis is used.

If for example rotation around x and y is to be constrained to 45°, the arrow or vector $z_{cur}$ must not leave the cone as shown in FIG. 3. The distance is the angle between $z_{cur}$ to $z_{ref}$, determined according to:

$$\theta = \text{atan2}(\|Z_{cur} \times Z_{ref}\|, Z_{cur} \cdot Z_{ref})$$

$$d_{max} = \theta_{max} - \theta$$

The rotation matrix to rotate the Jacobian may $$R_j = [Z_{ref} \times Z_{cur}\ Z_{cur} \times (Z_{ref} \times Z_{cur}) Z_{curr}].$$

This may be generalized by $$\theta = \text{atan } 2(\|V_{cur} \times V_{ref}\|, V_{cur} \cdot V_{ref})$$

$$d = \theta_{max-\theta}$$

and $$R_j = [V_{ref} \times V_{cur}\ Z_{cur} \times (V_{ref} \times V_{cur}) V_{curr}].$$

where V is the unit vector that is not limited (of the corresponding frame), e.g.:

$V_{ref/curr} = x_{ref/curr}$ when constraining $y$ and $z$ $V_{ref/curr} = y_{ref/curr}$ when constraining $x$ and $z$ $V_{ref/curr} = z_{ref/curr}$ when constraining $x$ and $y$ The constrained Jacobian $J_c = J_{j,\ 1}$.

In order to constrain three rotational angles according to one embodiment the Jacobians and the maximal accelerations in the QP problem obtained by computing them for two axes and one axis independently may be stacked.

According to one aspect of the present invention a method to control a robot to perform at least one Cartesian or joint space task comprises: using or applying quadratic programming respectively (so as) to determine joint forces, in particular joint torques, and/or joint accelerations of said robot based one or more cost function(s) which depend(s) on said task.

According to one embodiment, said at least one Cartesian or joint space task is defined or (pre)determined on or in or with respect to one or more coordinates respectively, according to one embodiment position and/or orientation coordinates, in particular of a robot-fixed reference like the TCP, end effector or flange respectively, joint or the like, in Cartesian space or joint coordinates of the robot. The number of said coordinates may be six according to one embodiment or differ from six according to another embodiment.

As described herein, quadratic programming may be used advantageously to control a robot. In particular, quadratic programming may allow to control a robot to perform one or more tasks in a fast(er), (more) reliable and/or smooth(er) way. In particular, as already described in detail, a task $f_t$ may comprise or be defined respectively by desired Cartesian or joint acceleration, e.g.:

$$f_t = J_t \ddot{q} + \dot{J}_t \dot{q}$$

For example to approach an Cartesian pose $X_d$ or follow a Cartesian path may be formulated as a proportional and/or integral and/or differential control law, for example $f_t = K (X_d - X)$. The cost function depending on the task may be of the form:

$$\min_{\ddot{q}} \| J_t \ddot{q} - (f_t - \dot{J}_t \dot{q}) \|^2$$

This can be written in the quadratic form with $H_t(\ddot{q}) = J_t^T J_t$ and $g_t(\ddot{q}) = -J_t^T(f_t - \dot{J}_t \dot{q})$ in Cartesian space control and $H_t(\ddot{q}) = I$ and $g_t(\ddot{q}) = -f_t$ in the Joint space control.

As already described herein, according to one embodiment both, joint forces, in particular joint torques, and joint accelerations are both together used as problem variables, which not only can allow advantageously considering (in)equality constrains, in particular Cartesian and/or joint space and/or force, in particular torque, limits, but also may be used in force-control, in particular torque-control (which may particularly useful for compliant control of the robot) as well as in pose control (when using the determined joint accelerations, in particular integrating them into desired joint poses and/or velocities).

As already described herein, according to one embodiment the robot is redundant with respect to the at least one task. Preferably the robot comprises at least six, more preferably at least seven joints, in particular revolute joints. Quadratic programming may be used advantageously to control such redundant robots since the redundancy can be resolved easily in the cost function or quadratic problem respectively.

As already described herein, according to one embodiment the robot is force controlled, in particular torque controlled, and/or compliant controlled. In this way, advantageously human-robot interaction or cooperation can be realized respectively.

As already described herein, according to one embodiment the robot is pose controlled. In this way, advantageously precise robot movement or operation can be realized respectively.

As already described herein, according to one embodiment the robot is controlled to perform simultaneously said at least one Cartesian or joint space task and at least one other Cartesian or joint space task, in particular
two or more Cartesian space task(s);
two or more joint space task(s);
one or more Cartesian space task(s) and one or more joint space task(s).

According to one embodiment, said at least one other Cartesian or joint space task is defined or (pre)determined on or in or with respect to one or more coordinates respectively, according to one embodiment position and/or orientation coordinates, in particular of a robot fixed reference like the TCP, end effector or flange respectively, joint or the like, in Cartesian space or joint coordinates of the robot. The number of said coordinates may be six according to one embodiment or differ from six according to another embodiment.

As already described herein, according to one embodiment quadratic programming is used to determine (the) joint forces, in particular joint torques, and/or joint accelerations of said robot based on said two or more tasks, wherein one or more quadratic problem(s) is/are solved to determine said joint forces, in particular joint torques, and/or joint accelerations.

In particular one quadratic problem may be solved, applying soft hierarchy (scheme) as already described. Additionally or alternatively two or more quadratic problems may be solved, applying strict hierarchy (scheme) as already described, wherein one quadratic problem reflects at least one of the tasks and at least one other quadratic problem reflects at least one other of the tasks, wherein the high(er) prioritized tasks are reflected in (in)equality constraints of the (quadratic problems of the) low(er) prioritized tasks as already described.

As already described herein, according to one embodiment quadratic programming is used to determine the joint forces, in particular joint torques, and/or joint accelerations based on one or more inequality constraints, in particular
one or more, in particular upper and/or lower, pose limits, in particular position limits and/or orientation limits, in Cartesian space; and/or
one or more, in particular upper and/or lower, velocity limits in Cartesian space; and/or
one or more, in particular upper and/or lower, acceleration limit in Cartesian space; and/or
one or more, in particular upper and/or lower, pose limits in joint space; and/or
one or more, in particular upper and/or lower, velocity limits in joint space; and/or
one or more, in particular upper and/or lower, acceleration limit in joint space.

As already described herein, according to one embodiment at least one Cartesian and/or joint velocity and/or acceleration constraint is shaped such that a velocity limit becomes zero at a pose limit.

Additionally or alternatively, according to one embodiment orientation of a robot-fixed reference such as its TCP, end effector or flange respectively, tool or a joint like e.g. the elbow is limited with respect to at least one predetermined direction in Cartesian space as already described herein.

As already described herein, according to one embodiment the robot is controlled to perform the one or more Cartesian and/or joint space tasks while avoiding one or more static obstacles and/or one or more dynamic obstacles. Avoiding one or more (of said) obstacles may in particular be performed based on a Jacobian representing a constraint. Additionally or alternatively, according to one embodiment one or more (of said) obstacles, in particular its pose (relative to the robot) and/or shape, are determined based on a model, preferably a CAD model or the like, of the robots environment and/or based on computer vision.

According to one aspect of the present invention a system is hard- and/or software-wise configured to perform a method as described herein and/or comprises means for controlling the robot to perform the at least one Cartesian or joint space task using quadratic programming to determine joint forces, in particular joint torques, and/or joint accelerations of said robot based on at least one cost function which depends on said task.

According to one embodiment the system or its means respectively comprise:

means for pose control or force control, in particular torque control, and/or for compliant control of the robot based on the determined joint forces, in particular joint torques, and/or joint accelerations; and/or means for controlling the robot to perform simultaneously said at least one Cartesian or joint space task and at least one other Cartesian or joint space task, wherein quadratic programming is used to determine joint forces, in particular joint torques, and/or joint accelerations of said robot based on said at least two tasks, wherein at least one quadratic problem is solved to determine the joint forces, in particular joint torques, and/or joint accelerations; and/or means for prioritizing said at least two tasks among each other, in particular by a soft or strict hierarchy; and/or means for using quadratic programming to determine the joint forces, in particular joint torques, and/or joint accelerations based on at least one inequality constraint, in particular at least one pose limit, in particular position limit and/or orientation limit, at least one velocity limit and/or at least one acceleration limit in Cartesian and/or joint space; and/or means for shaping at least one Cartesian and/or joint velocity and/or acceleration constraint such that a velocity limit becomes zero at a pose limit; and/or means for limiting orientation of a robot-fixed reference with respect to at least one predetermined direction in Cartesian space; and/or means for controlling the robot to perform the one or more Cartesian and/or joint space tasks while avoiding at least one static or dynamic obstacle, in particular based on a Jacobian representing a constraint and/or determining said at least one obstacle based on a model of the robots environment and/or computer vision.

Means in the sense of the present invention can in particular be embodied by or comprise hardware and/or software respectively, in particular one or more programs or program modules and/or at least one, preferably digital, processing unit, in particular microprocessor unit (CPU), graphic card (GPU) or the like, preferably connected to a memory system and/or bus system data- or signal-wise respectively, in particular at least one computer. The processing unit can be adapted to process commands that are implemented as a program stored in a memory system, to receive input signals from a data bus and/or to output signals to a data bus. A memory system can comprise one or more, in particular different and/or digital, storage media, in particular optical, magnetic, solid-state and/or other non-volatile media. The program can be (designed or implemented in) such (a way) that it embodies or is capable of executing a method described herein, so that the processing unit, in particular computer, can carry out the steps of such a method and thus in particular can control the robot. In one embodiment, a computer program product can comprise, in particular, be a, preferably non-volatile, storage medium for storing a program or with a program stored thereon respectively, wherein an execution of this program causes a system or a controller, in particular a computer, to carry out a method as described herein or one or more of its steps.

In one embodiment, one or more, in particular all, steps of the method are carried out completely or partially automatically, in particular by the system or its means.

In one embodiment, the system comprises the robot.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 5:
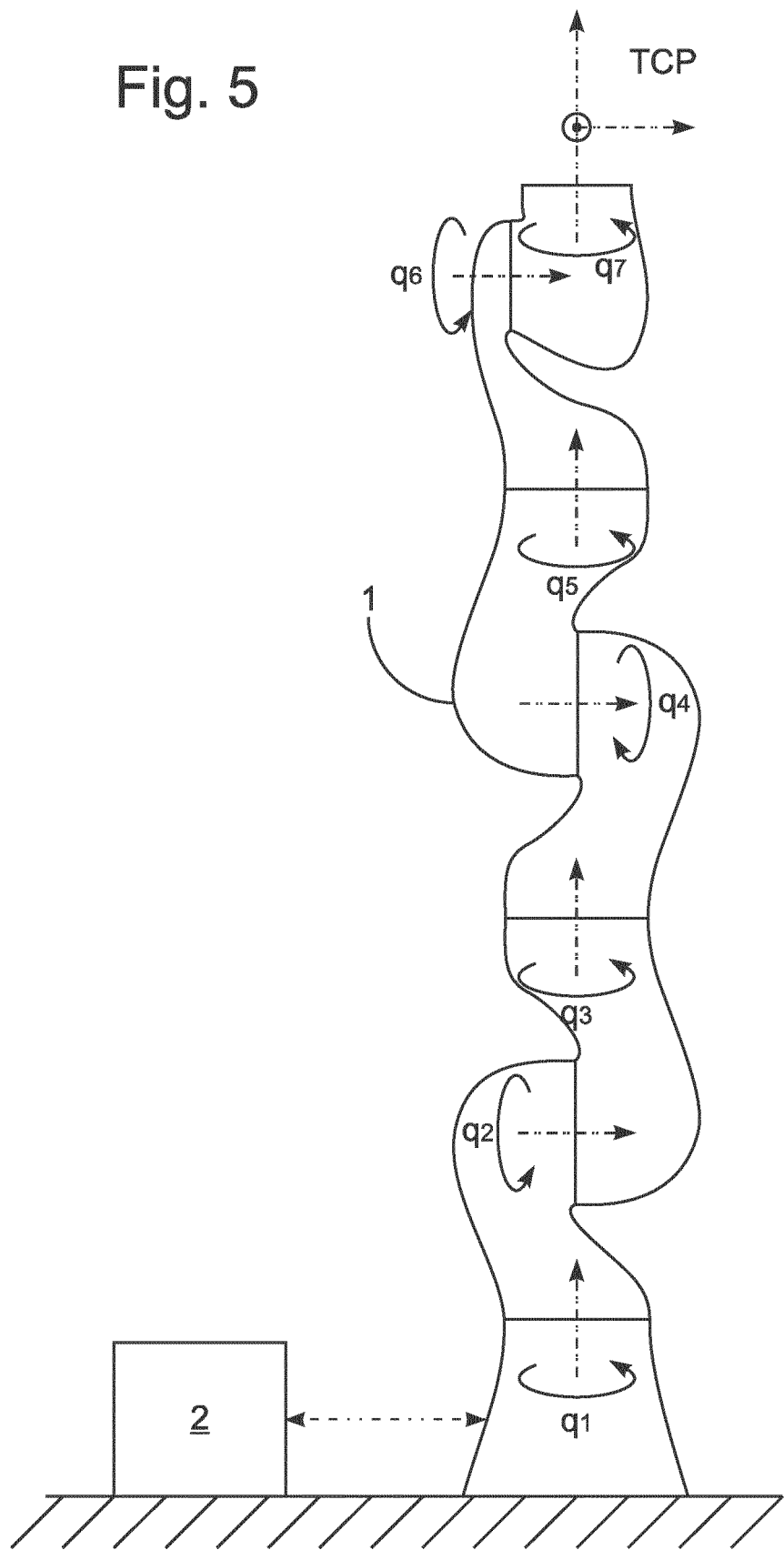
FIG. 5 schematically depicts a system with the robot according to one embodiment of the present invention.

FIG. 5 shows a system comprising a 7-DOF robot 1 and a robot control(ler) 2 control robot 1 to perform different Cartesian or joint space tasks simultaneously according to one embodiment of the present invention. $q_1, \ldots q_7$ denote the joint poses of robot 1, thus defining its joint space.

Figure 1:
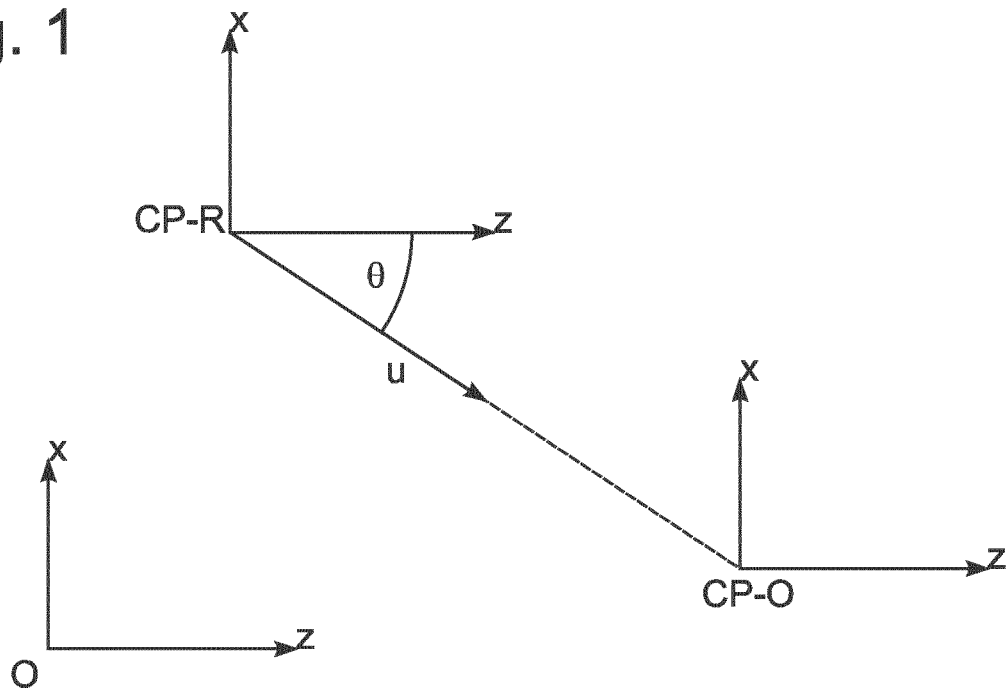
FIG. 1 schematically depicts a critical direction between critical points of a robot and an obstacle.
Figure 2:
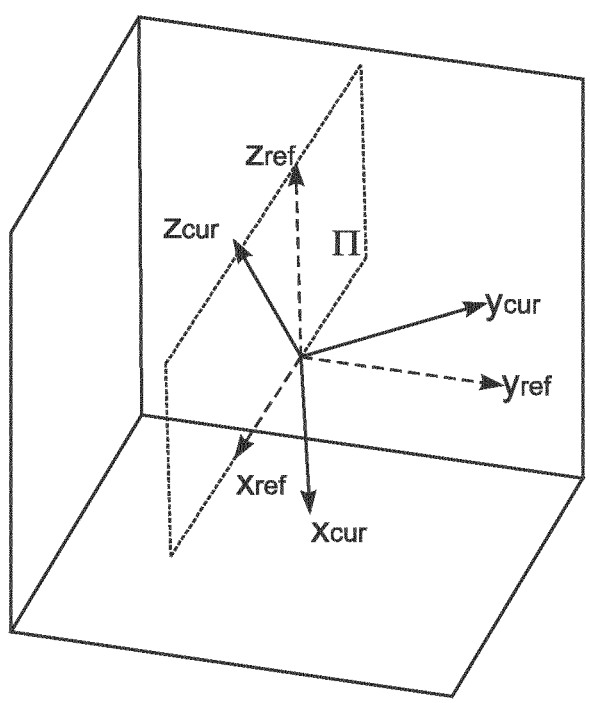
FIG. 2 schematically depicts a reference frame and a current frame.
Figure 3:
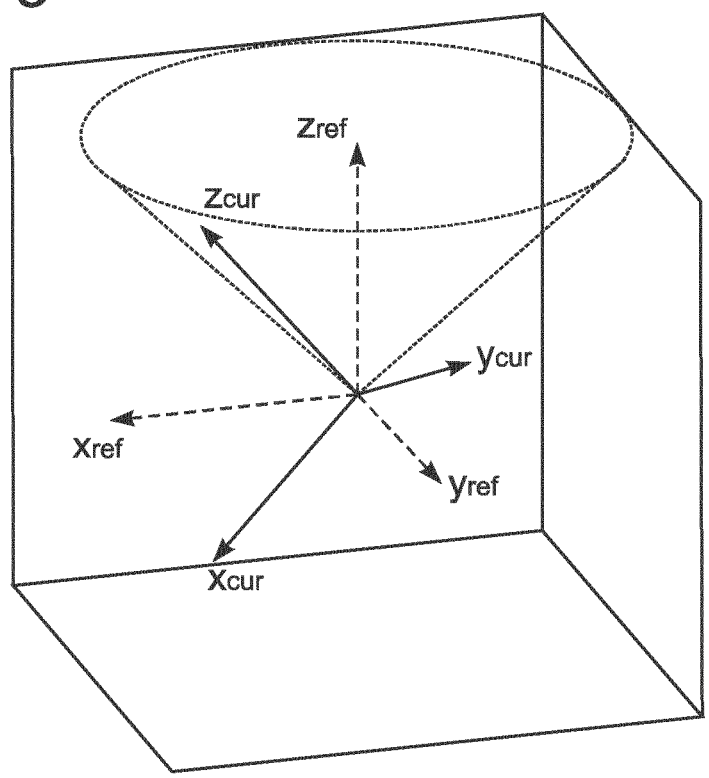
FIG. 3 depicts the reference frame and current frame with a cone.
Figure 4:
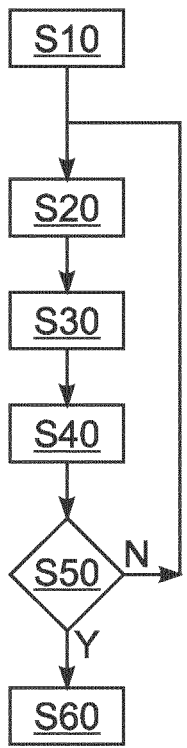
FIG. 4 illustrates a method to control the robot according to one embodiment of the present invention.

FIG. 4 shows a method performed by the robot control (ler) 2 to control robot 1 according to one embodiment of the present invention.

In a first step S10 a user determines the task(s) to be performed and/or pose, in particular position and/or orientation, limits in Cartesian space, e.g. limits for the robots TCP and/or an elbow of robot 1, velocity limits in Cartesian space, e.g. for the robots end effector or flange respectively, and/or pose and/or velocity limits in joint space, e.g. limits for $q_1, \ldots q_7$, and/or their time derivatives respectively. The user may determine the task(s) and/or limits by programing, selecting and/or parametrizing program modules or the like. The robot control(ler) 2 receives corresponding data in step S10.

In step S20 robot control(ler) 2 receives signals indicating the actual joint coordinates and/or their time derivatives and/or actual torques $\tau_1, \ldots \tau_7$, acting at the joint axes. Additionally it may receive signals from a computer vision system determining obstacles (not shown).

Based thereon robot control(ler) 2 solves the respective quadratic problem(s) to perform the predetermined task(s) while observing or complying with the predetermined limits respectively (step S30).

Joint torques $\tau_1, \ldots \tau_7$ and joint accelerations $\ddot{q}_1, \ldots, \ddot{q}_7$ are used as optimization problem variables. Thus, robot control(ler) 2 determines optimal joint torques and accelerations in step S30.

According to one embodiment, said optimal joint torques are used in a torque control in step S40, thus realizing a compliant control which allows a human operator to hand-guide the robot while it performs the task(s). According to another embodiment, said optimal joint accelerations are used in a pose control in step S40.

If the task(s) has/have been completed (step S50: "Y"), the method ends (step S60). Otherwise (step S50: "N"), a next cycle or time step is performed.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for controlling a robot to perform at least one Cartesian or joint space task, the robot comprising a plurality of links connected by joints, the method comprising:
    determining with a computer, at least one of joint forces or joint accelerations of the robot using quadratic programming and based on at least one cost function which depends on at least one first Cartesian or joint space task; and
    controlling the robot with the computer to perform the at least one first task based on the determined joint forces or joint accelerations.

2. The method of claim 1, wherein the joint forces are joint torques.

3. The method of claim 1, wherein at least one of:
    the robot is redundant with respect to the at least one first task;
    controlling the robot to perform the at least one first task comprises controlling the robot by force control; or
    controlling the robot to perform the at least one first task comprises controlling the robot by compliance control.

4. The method of claim 3, wherein controlling movement of the robot by force control comprises controlling movement of the robot by torque control.

5. The method of claim 1, wherein at least one of:
    the robot is redundant with respect to the at least one first task; or
    controlling the robot to perform the at least one first task comprises controlling the robot by pose control.

6. The method of claim 1, further comprising:
    controlling the robot to perform at least one second Cartesian or joint space task simultaneously with the at least one first task;
    wherein quadratic programming is used to determine at least one of joint forces or joint accelerations of the robot based on the at least one first task and the at least one second task; and
    wherein at least one quadratic problem is solved to determine the joint forces or joint accelerations.

7. The method of claim 6, wherein the joint forces comprise joint torques.

8. The method of claim 6, further comprising:
    prioritizing the at least one first task and the at least one second task among each other.

9. The method of claim 8, wherein prioritizing the at least one first task and the at least one second task comprises selectively prioritizing the tasks by a soft hierarchy or a strict hierarchy.

10. The method of claim 9, wherein the at least one first task and the at least one second task are prioritized by a soft hierarchy by assigning a weight for each task depending on a relative importance of a given task to other tasks.

11. The method of claim 9, wherein the at least one first task and the at least one second task are prioritized by a strict hierarchy, wherein priority guaranties the prioritized scheme and lower priority tasks are scarified if they conflict with higher priority tasks.

12. The method of claim 1, wherein using quadratic programming to determine at least one of joint forces or joint accelerations of the robot is based on at least one of:
    at least one inequality constraint in Cartesian and/or joint space;
    at least one velocity limit in Cartesian and/or joint space; or
    at least one acceleration limit in Cartesian and/or joint space.

13. The method of claim 12, wherein at least one of:
    the joint forces comprise joint torques; or
    the at least one inequality constraint comprises at least one of:
        at least one pose limit,
        at least one position limit, or
        at least one orientation limit.

14. The method of claim 12, wherein at least one of:
    one or more of at least one Cartesian constraint, at least one joint velocity constraint, or at least one acceleration constraint is shaped such that a velocity limit becomes zero at a pose limit; or
    an orientation of a robot-fixed reference with respect to at least one predetermined direction in Cartesian space is limited.

15. The method of claim 1, wherein controlling the robot to perform the at least one task comprises controlling the robot while avoiding at least one static or dynamic obstacle.

16. The method of claim 15, wherein at least one of:
    avoiding at least one obstacle is performed based on a Jacobian representing a constraint; or
    the at least one obstacle is determined based on at least one of a model of the environment surrounding the robot or on computer vision.

17. A system for controlling a robot to perform at least one Cartesian or joint space task, the system comprising:
    means including a microprocessor for determining at least one of joint forces or joint accelerations of the robot using quadratic programming and based on at least one cost function which depends on the at least one first task; and
    means including a microprocessor for controlling the robot to perform the at least one first task based on the at least one determined joint forces or joint accelerations.

18. A computer program product for controlling a robot to perform at least one Cartesian or joint space task, the computer program product comprising program code stored on a non-transitory, computer-readable medium, the program code, when executed by a computer, causing the computer to:
    determine at least one of joint forces or joint accelerations of the robot using quadratic programming and based on at least one cost function which depends on the at least one first task; and
    control the robot to perform the at least one first task based on the at least one determined joint forces or joint accelerations.

* * * * *